July 7, 1959     O. C. KINDORF     2,893,669
SUPPORT FOR EXPANSIBLE CONDUIT
Filed Nov. 23, 1956     2 Sheets-Sheet 1
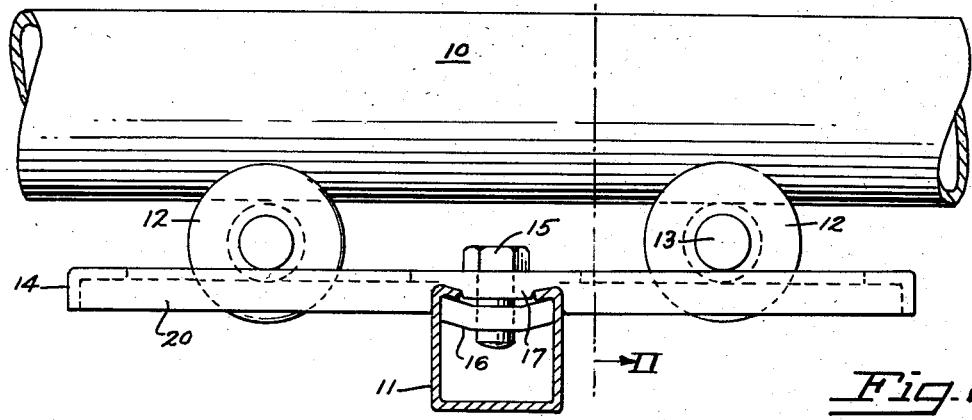
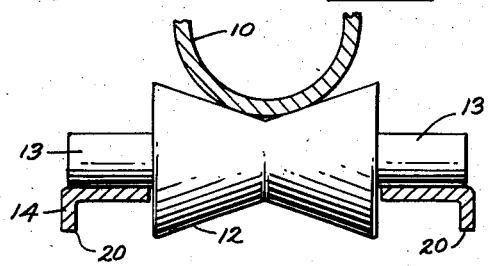
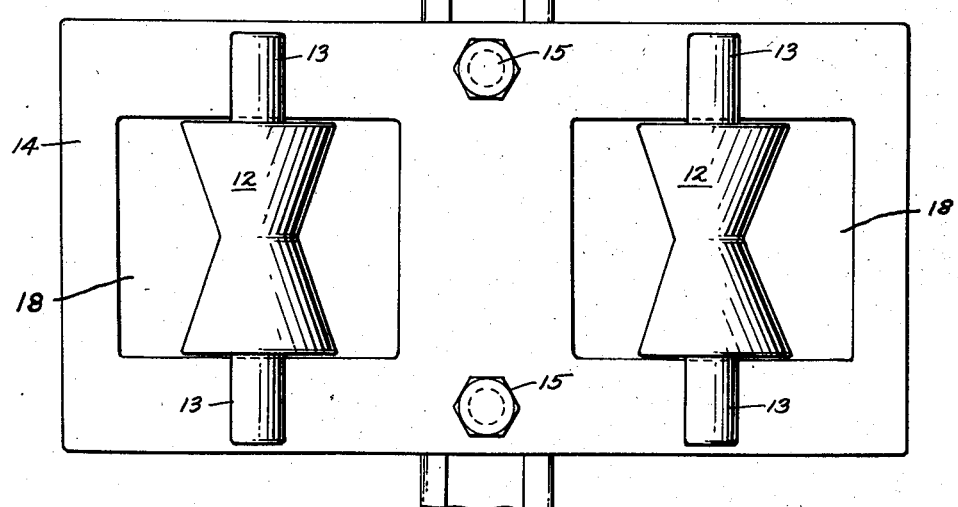
INVENTOR.
ORLAN C. KINDORF
BY
*Fryer + Johnson*
ATTORNEYS July 7, 1959
O. C. KINDORF
2,893,669
SUPPORT FOR EXPANSIBLE CONDUIT
Filed Nov. 23, 1956
2 Sheets-Sheet 2
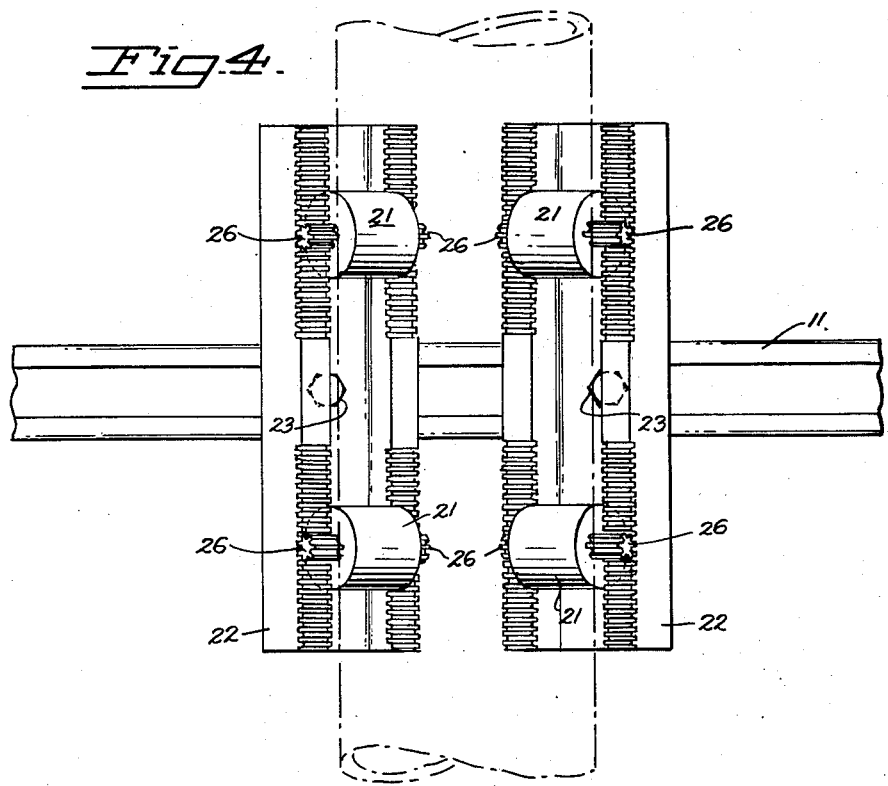
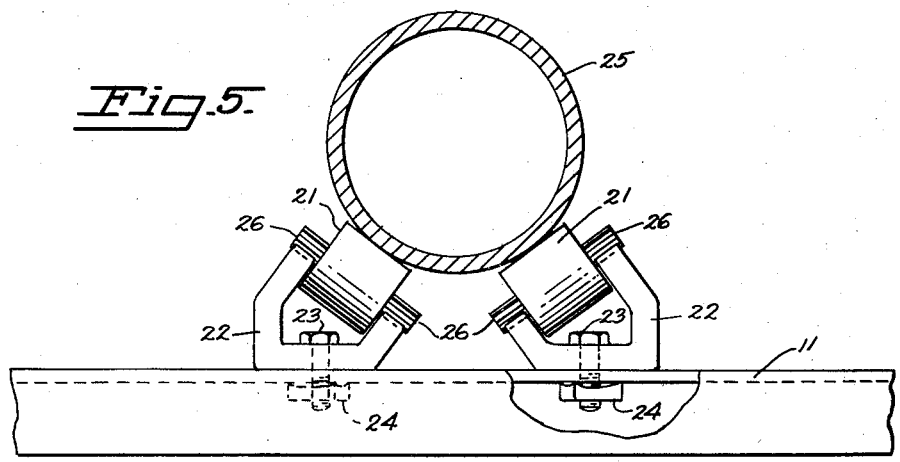
INVENTOR.
ORLAN C. KINDORF
BY
*Fryer - Johnson*
ATTORNEYS

United States Patent Office 2,893,669
Patented July 7, 1959

2,893,669

SUPPORT FOR EXPANSIBLE CONDUIT

Orlan C. Kindorf, Piedmont, Calif.

Application November 23, 1956, Serial No. 623,985

3 Claims. (Cl. 248—55)

This invention relates to supports for conduits or the like which expand and contract due to temperature variations.

There are numerous ways of accommodating the expansion and contraction of conduits at the points where they are supported on hangers or brackets. One conventional way is to provide rollers of various forms which underlie the conduit and turn as the conduit moves during expansion and contraction. These rollers are usually provided with trunnions journaled in bearings supported on the brackets or other means provided as the main supports for the conduit. This method has disadvantages among which is the difficulty encountered when the bearings become corroded or dirty so that the roller will not turn.

It is an object of the present invention to provide a support for expansible conduits which overcomes the disadvantages inherent in presently known supports and particularly to provide such a support in which the rollers have trunnions which roll on a track rather than turn in a bearing and thus greatly reduce the possibility of their becoming frozen or stuck.

Another object of the present invention is to provide a support of the kind described in which the rollers move a short distance relative to the extent of movement of the supported conduit.

A still further object of the invention is the provision of a roller-type support which is carried by a bracket or the like with its weight so distributed that the tendency of the bracket to twist is eliminated.

Further and more specific objects and advantages of the invention in the manner in which it is carried into practice are made apparent in the following detailed specification wherein reference is made to the accompanying drawings.

In the drawings:

Fig. 1 is a view in side elevation of a support for an expansible conduit constructed in accordance with the present invention;

Fig. 2 is a sectional view taken on the line II—II of Fig. 1;

Fig. 3 is a plan view of the support illustrated in Fig. 1;

Fig. 4 is a plan view of a modified form of the support; and

Fig. 5 is a view in end elevation of the support shown in Fig. 4.

Referring first to Figs. 1, 2 and 3 of the drawings, a pipe 10 is illustrated as supported by a bracket 11 through the medium of a support structure constructed in accordance with the present invention. The bracket 11 is a well-known channel-shaped member which may be connected with the wall floor or ceiling of a building or other structure in any one of many conventional ways as supporting means for a conduit or group of conduits.

The present invention provides a pair of rollers 12, the external surfaces of which taper inwardly toward their centers as illustrated in Fig. 3 to provide a centering effect for a conduit which rests upon them. Each of the rollers is provided with trunnions 13 at its ends which rest on and are adapted to roll over the surface of a track plate 14. The track plate is connected as by bolts 15 and nuts 16 to the upper open side of the channel bracket 11 in a well-known manner. The under surface of the track plate 14 is provided with a ridge or projection 17 extending transversely across it in a central position and fitting into the opening in the top of the channel member to positively insure against any twisting action of the track plate relative to the channel. The track plate has openings, best illustrated at 18 in Fig. 3, which receive the rollers and the openings are sufficiently long to permit the rollers to move or roll longitudinally with respect to the track plate with the pipe resting upon them and its weight carried by the trunnions 13 where they rest upon the upper surface of the track plate.

With the construction described above, the trunnions 13 are not carried in bearings where their turning movement is easily prevented by corrosion or dirt but roll freely over the flat surface of the track plate.

A further advantage of this construction results from the fact that the trunnions are considerably smaller in diameter than the rollers and, therefore, a relatively long movement of the pipe, caused by expansion, is accommodated by a very short movement of the roller on the track plate so that the track plate need not be of excessive length. For example if the pipe is resting on the roller at a point where it is one and one-half inches in diameter and the trunnions are one-half inch in diameter, a four and one-half inch movement due to expansion or contraction will cause only about one and one-half inch movement of the trunnions along the surface of the track.

Another advantage of this construction resides in the use of two rollers bearing upon opposite sides of the track plate which extends across the bracket 11. This results in an even distribution of weight on opposite sides of the bracket reducing any tendency of the bracket to twist under the weight of the conduit.

The track plate 14 is also preferably provided with reinforcing ribs or flanges 20 which extend downwardly from its opposite edges and terminate at their inner ends in contact with the side walls of the supporting channel 11 so as to provide additional support against downward bending movement of the track plate.

Figs. 4 and 5 of the drawings illustrate a modification of the invention in which two pairs of rollers are provided instead of the two single rollers illustrated in Fig. 1. The rollers shown at 21 in Figs. 4 and 5 are carried on separate track plates of the configuration illustrated at 22 and they are simple cylindrical rollers supported in angular positions so that pipes of widely varying sizes may be supported by positioning the track plates 22 at different spacing. In this modification, the track plates 22 are also connected to a channel-shaped bracket member 11 as by bolts 23 and nuts 24 similar to the bolts 15 and nuts 16 in the other modification. The pipe illustrated at 25 is supported between the pairs of rollers as shown in Fig. 5. The trunnions on the rollers 21 are shown at 26 as provided with gear teeth and the surfaces of the track plates 22 upon which the trunnions ride are also toothed in the manner of a rack bar so that the teeth of the trunnions mesh with the teeth on the track plate and the rollers are thereby guided in their movement and prevented from twisting or skewing to positions of misalignment with the pipe and track plates. It is to be understood, however, that the track plate may be used with or without the meshing gear teeth and also that such teeth can be provided on the modification illustrated in Figs. 1 to 3 if desired.

The modification illustrated in Figs. 4 and 5 has the advantages previously pointed out and also provides the further advantage of being adjustable to accommodate conduits throughout a wide range of sizes.

I claim:

1. A device to support an expansible conduit with respect to a stationary bracket disposed below and extending transversely of the conduit which comprises a track plate resting on the bracket and extending parallel to the conduit in both directions from the bracket and rollers on the track plate supporting the conduit at positions on both sides of the bracket to prevent the application of twisting forces to the bracket.

2. A device to support an expansible conduit with respect to a stationary bracket disposed below and extending transversely of the conduit which comprises a pair of track plates supported by the bracket extending parallel to the conduit and arranged at opposite sides of the longitudinal center line of the conduit, and two rollers on each track plate supporting the conduit at opposite sides of the bracket.

3. A device to support an expansible conduit with respect to a stationary bracket disposed below and extending transversely of the conduit which comprises a pair of track plates supported by the bracket and extending parallel to the conduit and arranged at opposite sides of the longitudinal center line of the conduit, and two rollers on each track plate supporting the conduit at opposite sides of the bracket, the surfaces of said rollers at their point of contact with the conduit being substantially tangentially to the conduit.

References Cited in the file of this patent

UNITED STATES PATENTS

| | | |
|---|---|---|
| 764,491 | Newlove | July 5, 1904 |
| 1,056,028 | Kehm | Mar. 18, 1913 |
| 1,110,130 | Gray | Sept. 18, 1914 |
| 1,133,855 | Gray | Mar. 30, 1915 |
| 1,647,448 | Jones | Nov. 1, 1927 |
| 1,788,939 | Axlund | Jan. 13, 1931 |
| 2,375,513 | Bach | May 8, 1945 |
| 2,561,540 | Sherbrooke | July 24, 1951 |
| 2,673,636 | Vermette | Mar. 30, 1954 |